Patented Dec. 29, 1931

1,838,234

UNITED STATES PATENT OFFICE

KARL SCHIRMACHER AND LUDWIG VAN ZÜTPHEN, OF FRANKFORT-ON-THE-MAIN-HOCHST, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PROCESS OF POLYMERIZING HYDROCARBONS OF THE BUTADIENE SERIES

No Drawing. Application filed June 28, 1929, Serial No. 374,612, and in Germany July 12, 1928.

The present invention relates to a process of polymerizing hydrocarbons of the butadiene series.

Various processes are already known for polymerizing butadiene and the hydrocarbons of this series with the aid of metallic sodium so as to form caoutchouc-like substances. The polymerization process takes a rapid course in certain cases with vehemence resembling explosion, and thus polymerized products of insufficient homogeneity are obtained.

According to this invention there is used sodium hydride instead of sodium; the reaction is thereby considerably retarded and accordingly the polymerized product shows a much more homogeneous character. The course of the polymerization process may be accelerated by raising the temperature during the reaction. The proportion of sodium hydride to be used may vary within wide limits. The conversion is advantageously carried out in a vessel in which the mass can be kept in motion, and an indifferent agent may be present.

The following examples illustrate the invention, but they are not intended to limit it thereto, the parts being by weight:

1. 2000 parts of liquefied butadiene are placed in an iron pressure vessel in which the mass can be agitated, and 20 parts of sodium hydride are then added. The mass is left alone for a considerable time at a temperature of from about 30° C. to about 50° C. (if necessary while stirring) until the whole or the greater part of the butadiene has disappeared.

The mass is worked up in such a manner that after elimination of the butadiene which may sometimes still be present, the caoutchouc is either separated from the sodium hydride by means of a solvent, or the sodium hydride is destroyed by adding some alcohol.

2. 200 parts of liquefied butadiene, 200 parts of dry benzene free from thiophene and 2 parts of sodium hydride are heated for a considerable time to a temperature of between 30° C. and 40° C. in a pressure vessel in which the mass can be agitated. When the polymerization is complete, the mass is diluted with acetone in order to precipitate the caoutchouc which is washed first with a small quantity of alcohol and then with a large quantity of water in order to eliminate the sodium hydride.

We claim:

1. Process of polymerizing hydrocarbons of the butadiene series which comprises treating the hydrocarbons with sodium hydride.

2. Process of polymerizing hydrocarbons of the butadiene series which comprises treating the hydrocarbons with sodium hydride in the presence of an inert diluent.

3. Process of polymerizing hydrocarbons of the butadiene series which comprises treating the hydrocarbons with sodium hydride in the presence of an inert diluent at a temperature of between about 30° C. and about 50° C.

4. Process of polymerizing butadiene which comprises treating butadiene with sodium hydride in the presence of dry benzene free from thiophene at a temperature of between 30° C. and 40° C.

In testimony whereof, we affix our signatures.

KARL SCHIRMACHER.
LUDWIG VAN ZÜTPHEN.